United States Patent [19]

Musket

[11] Patent Number: 5,394,640
[45] Date of Patent: Mar. 7, 1995

[54] GLUE TRAP FOR ROACHES

[75] Inventor: David C. Musket, Kutztown, Pa.

[73] Assignee: Woodstream Corporation, Lititz, Pa.

[21] Appl. No.: 136,461

[22] Filed: Oct. 15, 1993

[51] Int. Cl.⁶ .............................................. A01M 1/14
[52] U.S. Cl. ................................................... 43/114
[58] Field of Search ................................ 43/107, 114

[56] References Cited

U.S. PATENT DOCUMENTS

| | | |
|---|---|---|
| 393,273 | 11/1888 | Thum . |
| 469,021 | 2/1892 | Smith . |
| 793,871 | 7/1905 | Bien . |
| 1,411,931 | 4/1922 | Pfeiffer, Sr. . |
| 3,304,646 | 2/1967 | Staley . |
| 3,398,478 | 8/1968 | Pearsall . |
| 3,913,259 | 10/1975 | Nishimura et al. . |
| 4,103,448 | 8/1978 | Souza . |
| 4,385,465 | 5/1983 | Palmeri . |
| 4,425,731 | 1/1984 | Orlando . |
| 5,048,224 | 9/1991 | Frisch . |

*Primary Examiner*—Kurt Rowan
*Attorney, Agent, or Firm*—Jacobson, Price, Holman & Stern

[57] ABSTRACT

A glue trap for roaches is formed as an enclosed paperboard receptacle which requires no additional outer wrapper so that the trap itself forms it own packaging. The receptacle is in the form of a shallow rectangular box divided internally into transverse passageways and with non-drying adhesive on its interior walls. To convert the package for use as a trap, the side walls of the box are provided with tear-out panels which provide endwise access openings to the passageways.

10 Claims, 1 Drawing Sheet

GLUE TRAP FOR ROACHES

BACKGROUND OF THE INVENTION

This invention relates to glue traps used for catching subjects such as vermin, rodents, insects or the like, the traps being of the kind which use a layer of very stick non-drying adhesive onto which the subject may be enticed or otherwise caused to engage and from which the subject cannot then extricate itself. The invention is particularly concerned with a glue trap which is suitable for catching roaches.

Glue traps, in general, are well-known and numerous designs are available for diverse applications. Commonly, for catching roaches and other insects or small rodents, such traps are made in disposable form from lightweight sheet material, such as plastic or paperboard stock. Generally, the traps are packaged for sale, individually or in batches, in some form of outer packaging or wrapper. When the traps are used, it is therefore also necessary to dispose of the wrapper.

SUMMARY OF THE INVENTION

It is an object of the invention to provide a disposable glue trap, particularly suitable for catching roaches, which forms its own packaging, thereby dispensing with the need for an outer wrapper.

Another object of the invention is to provide an enclosed substantially sealed glue trap package which is readily converted into a roach trap simply by removing one or more tear-away panels from the package.

It is another object of the invention to provide a glue trap as described which is made of folded blanks of paperboard or like stock and which provides plural narrow internal passageways, of the type favored by roaches, and common entry ways to the passages which are formed by tear-away panels.

Thus, at least in a preferred form thereof, the invention provides a disposable glue trap packaged formed from two paperboard blanks. A larger outer blank is folded to form a shallow enclosed box-like receptacle with top, bottom and side walls, the receptacle including an internal layer of non-drying adhesive at least on the bottom wall. A smaller inner blank is folded into pleats or corrugations of equal height to the side walls of the box-like receptacle. The corrugated blank is positioned within the receptacle prior to its being sealed shut and effectively divides the receptacle into plural, parallel passageways.

The box-like receptacle is substantially totally enclosed and forms its own packaging. Its outer surfaces may be printed with advertising material and instructions for use, and it may incorporate a suspension panel with a aperture for suspending the package from a hook or the like at a point of sale.

Opposite walls of the receptacle are provided along their length with tear-away panels which, which removed, provide access openings at opposite ends of the passageways and thereby readily convert the package for use as a glue trap for roaches. In one preferred form of the invention, the receptacle may have further tear-away panels providing centralized access to batches of the passageways.

Additional features and advantages of the invention will become apparent from the ensuing description and claims read in conjunction with the attached drawings.

DESCRIPTION OF PREFERRED EMBODIMENT

Figure 1:
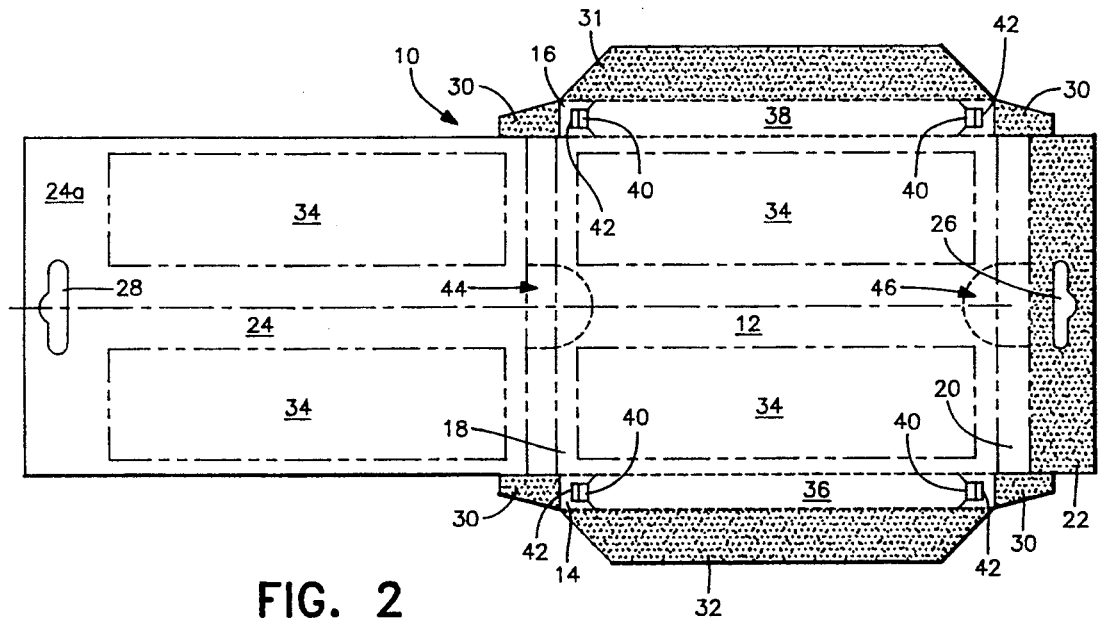
FIG. 1 is a plan view of a paperboard blank to be folded into a shallow box-like receptacle for a glue trap package according to the invention.
Figure 3:
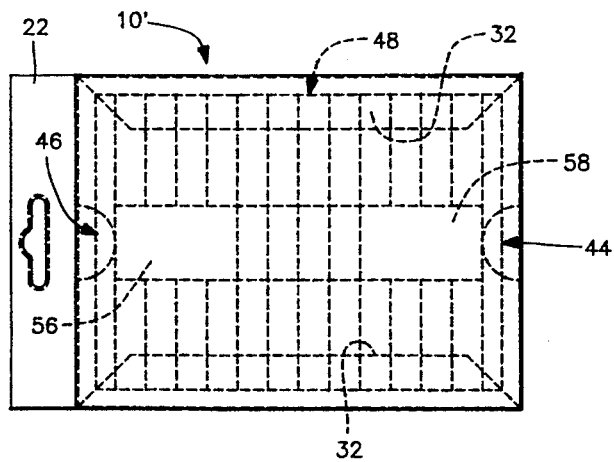
FIG. 3 is a plan view of a completed glue trap package made from the two blanks.
Figure 4:
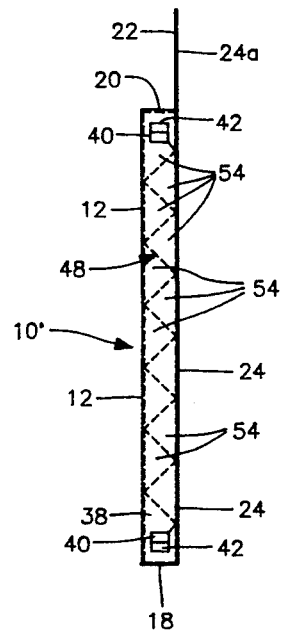
FIG. 4 is a side view of the package.

The paperboard blank 10, shown in FIG. 1 is cut to shape such that it can be folded into the configuration of a shallow sealed box-like receptacle 10' as illustrated in FIGS. 3 and 4. To this end, blank 10 includes a rectangular top wall section 12 surrounded by shallow side wall sections 14, 16 and end wall sections 18, 20. For use as a roach trap, for example, the depth of the shallow side and end wall sections may be of the order of about ½". The respective wall sections of the blank are separated from each other by fold lines (shown as chain-dotted lines) suitably impressed or scored in the blank.

Adjacent end wall section 20 of the blank is a first suspension panel-forming section 22 again separated from section 20 by a transverse fold line. Adjacent end wall section 18 is a base wall section 24 also separated from section 18 by a transverse fold line. Base wall section 24 has an extension portion 24a providing a second suspension panel-forming section to fit against the first panel-forming section 22 as seen in FIG. 4. The panel-forming sections have registrable suspension apertures 26, 28 preferably of somewhat unequal size to accommodate slight misalignments. The upper surface of section 22 carries a contact adhesive for securing extension portion 24a.

At opposite ends of the side wall section 14, 16 are slit fold-in tabs 30 provided with contact adhesive for securement to the end wall sections 18, 20 when the blank is folded to form receptacle 10'. Also, along the outer edge of each side wall section is an adhesive fold-over panel 32 for securing to the base wall section 24. Inner surfaces of the base wall and top wall sections of the blank are provided with layers 34 of non-drying roach-catching adhesive and this adhesive itself may be sufficient to secure the base section to panels 32 without the need for additional adhesive on panels 32.

Effectively the entire surface of each of the side wall sections 14, 16 of blank 10 is formed by a respective tear-out panel 36 or 38 defined by perforations (shown dotted) extending along the fold lines which define the upper and lower edges of the respective side wall sections. At each end, the tear out panels have slits defining pull tabs 40 for the tear-out panels and the blank is cut with access apertures 42 for the pull tabs.

Blank 10 is provided with further tear-out panels 44, 46 each having a rectangular portion in a respective end wall section 18 or 20 and an arcuate portion extending into the top wall section 12.

It is evident that blank 10 can be formed into receptacle 10' by folding up the side and end wall sections 14, 20 and securing same by means of the adhesive tabs 30, then folding over the base wall section, securing same to the folded-in panels 32, and securing panel-forming section 22 to panel-forming section 24a. Before the final steps, however, an insert (FIG. 2) is placed in the box-like receptacle to divide same into a plurality of narrow passageways.

Figure 2:
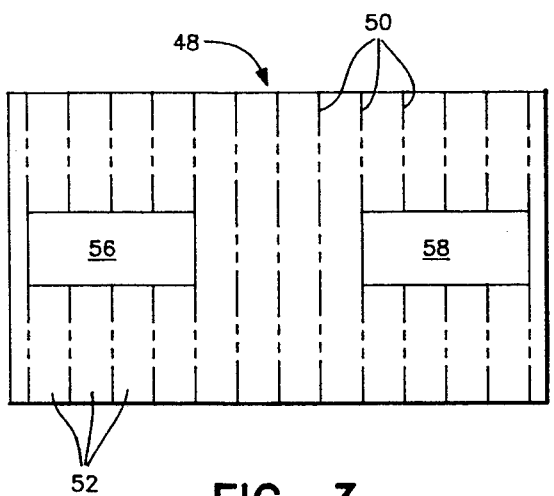
FIG. 2 is a plan view of another paperboard blank to be folded and positioned inside of the receptacle.

FIG. 2 shows a second rectangular paperboard blank 48 to provide the insert for dividing receptacle 10 into such plural passageways. Thus, blank 48 is divided by transverse fold lines 50 into a plurality of transverse sections 52 and the size of the blank is such that when folded into corrugated form as shown in FIG. 4, it will fit substantially exactly into receptacle 10' and the apeces of the respective corrugations will be held in place by the adhesive layers 34. The insert then divides the interior of receptacle 10' into a series of narrow transverse passageways 54. Also blank 44 is formed with two large rectangular apertures 56, 58 intended to communicate with inlet apertures which are provided by the removal of tearout panels 44, 46.

The receptacle 10' shown in FIGS. 3 and 4 thus provides a self-contained and sealed disposable glue trap package requiring no outer wrapper. The outer surface of the package may carry suitable printed matter such as advertising and instructions for use. The suspension panel 22, 24a can be used for suspending the package at a point of sale and can be used as a hold-down means for the trap when in use.

To convert package 10' into a trap, it is necessary only to remove tear-out panels 36, 38 providing endwise access to the passageways 54. Panels 44, 46 can also be removed so as to provide additional central access points to the end-most passageways on each side of the trap.

Thus, it is evident that the invention provides a simple and economical form of disposable glue trap for rodents which forms it own package requiring no outer wrapper, and which is readily converted for use simply by removal of the tear-out panels. It is also evident that the trap can be used either with the base wall or the top wall resting on a support surface.

While only a preferred embodiment of the invention has been described herein in detail, the invention is not limited thereby, and modifications can be made within the scope of the attached claims.

I claim:

1. A package to be converted into a glue trap for roaches and like insects comprising a shallow enclosed box-like receptacle made of sheet material and having a base wall, side walls, end walls and a top wall, a layer of non-drying adhesive internally provided at least on the base wall of the receptacle, internal means dividing the receptacle into a plurality of transverse passageways and at least one of said side walls and end walls including tear-out panel means for providing an access opening to said passageways, wherein each of the side walls includes an elongate tear-out panel for providing access to said passageways, the tear-out panels extending substantially along the entire length of each side wall and being defined by perforation lines along top and bottom edges of the respective side wall.

2. A package as defined in claim 1, wherein each tear-out panel includes pull tabs at opposite ends of the panel, the pull tabs being defined by slits and an aperture formed in the respective side wall of the receptacle.

3. A package as defined in claim 1, wherein said internal means comprises a corrugated sheet having apeces adhesively engaged to at least one of said top and bottom walls of the receptacle.

4. A package as defined in claim 3, wherein said sheet includes a centralized aperture adjacent at least one end of the sheet and wherein an end wall of the receptacle includes a centralized tear-out panel extending partly into the top wall for providing a centralized access opening to endmost ones of said passageways communicating with said aperture.

5. A package as defined in claim 4, wherein the side walls of the receptacle are each provided with an elongate tear-out panel extending substantially along the entire length of the side wall for providing endwise access to said passageways.

6. A package to be converted into a glue trap for roaches and like insects comprising a shallow enclosed box-like receptacle made of sheet material and having a base wall, side walls, end walls and a top wall, a layer of non-drying adhesive internally provided at least on the base wall of the receptacle, internal means dividing the receptacle into a plurality of transverse passageways and at least one of said side walls and end walls including tear-out panel means for providing an access opening to said passageways, wherein the receptacle is formed from a folded blank of sheet material with integral adhesive tabs securing the side walls to the end walls and integral folded over panels adhesively securing the base wall to the side walls.

7. A package to be converted into a glue trap for roaches and like insects comprising a shallow enclosed box-like receptacle made of sheet material and having a base wall, side walls, end walls and a top wall, a layer of non-drying adhesive internally provided at least on the base wall of the receptacle, internal means dividing the receptacle into a plurality of transverse passageways and at least one of said side walls and end walls including tear-out panel means for providing an access opening to said passageways, the package including a suspension panel with a suspension aperture extending from one end of the base wall and coplanar with the base wall.

8. A package for conversion into a glue trap for catching roaches or like insects comprising a shallow enclosed rectangular receptacle having a base wall, side walls, end walls and a top wall formed from a folded blank of sheet material, a nondrying adhesive layer internally provided on at least the base wall of the receptacle, a corrugated sheet internally located within the receptacle, said sheet having apeces adhesively engaging at least one of said top and bottom walls of the receptacle, said sheet dividing the receptacle into a plurality of transverse passageways, and each of said side walls of the receptacle including a tear-out panel extending substantially along the length of the side wall for providing endwise access to the passageways, wherein each tear-out panel is defined by perforations extending substantially along top and bottom edges of the respective side wall.

9. A package as defined in claim 8, wherein each tear-out panel includes a pull tab at one end of the panel, the pull tab being defined by slits and an aperture in the respective side wall.

10. A package for conversion into a glue trap for catching roaches or like insects comprising a shallow enclosed rectangular receptacle having a base wall, side walls, end walls and a top wall formed from a folded blank of sheet material, a non-drying adhesive layer internally provided on at least the base wall of the receptacle, a corrugated sheet internally located within the receptacle, said sheet having apeces adhesively engaging at least one of said top and bottom walls of the receptacle, said sheet dividing the receptacle into a plurality of transverse passageways, and each of said side walls of the receptacle including a tear-out panel extending substantially along the length of the side wall for providing endwise access to the passageways, wherein the corrugated sheet has a centralized aperture adjacent each end of the sheet, and wherein the end walls of the receptacle are each provided with a centralized tear-out panel extending partly into the top wall for providing a centralized access opening to endmost ones of said passageways communicating with a respective one of the apertures in the corrugated sheet.

* * * * *